June 27, 1967 — B. D. ALM — 3,327,351
TIRE VULCANIZING APPARATUS
Filed Oct. 30, 1964 — 3 Sheets-Sheet 1

INVENTOR.
BERNARD D. ALM
BY Douglas S. Johnson
Attorney

June 27, 1967   B. D. ALM   3,327,351
TIRE VULCANIZING APPARATUS
Filed Oct. 30, 1964   3 Sheets-Sheet 3

INVENTOR.
BERNARD D. ALM
BY Douglas S. Johnson
Attorney

United States Patent Office 3,327,351
Patented June 27, 1967

3,327,351
TIRE VULCANIZING APPARATUS
Bernard D. Alm, Don Mills, Ontario, Canada, assignor to Vulcan Equipment Company Limited, Toronto, Ontario, Canada
Filed Oct. 30, 1964, Ser. No. 407,649
2 Claims. (Cl. 18—18)

This invention relates to vulcanizing apparatus of the type where heat and pressure is applied to the portion of the tire casing for vulcanizing repair material applied to the casing in the form of plugs and/or patches.

With improvements in self curing materials there has been renewed interest in the method of chemical repairing of tires since this method offers certain attractions, viz. heat need not be applied to the casing, special equipment is not required and there is absence of tire distortion. However, despite recent improvements in self curing materials the chemical repair method is still subject to certain disabilities in varying degrees, viz. porous patches and/or plugs, insufficient rubber flow causing poor appearance and adhesion and also ultimate failure due to patch bridging.

In order to overcome these disadvantages it is recognised that pressure should be applied to the plug and the patch, the trend being to cure the plug separately, at the same time applying pressure by means of a C-clamp after which the patch is applied, the adhesion of which is then dependent on the inflation of pressure when the tire is mounted. However, it has been found that the most satisfactory method of operation is to apply pressure to both plug and patch before the tire is mounted. While this is most effective in accomplishing a proper repair it has been found that tire distortion occurs due to sideways expansion.

The invention has for an object to provide vulcanizing apparatus of the character described in which there is no sideways expansion of the tire and hence no distortion.

A further object of the invention is to provide vulcanizing apparatus wherein heat is applied to the plug and patch only.

A further object of the invention is to provide a lightweight, portable vulcanizing apparatus which will accommodate a large range of tires.

It is a further object of the invention to provide vulcanizing apparatus which provides proper pressure to shoulder repairs.

The invention will now be described with reference to the accompanying drawings, in which.

Figure 1:
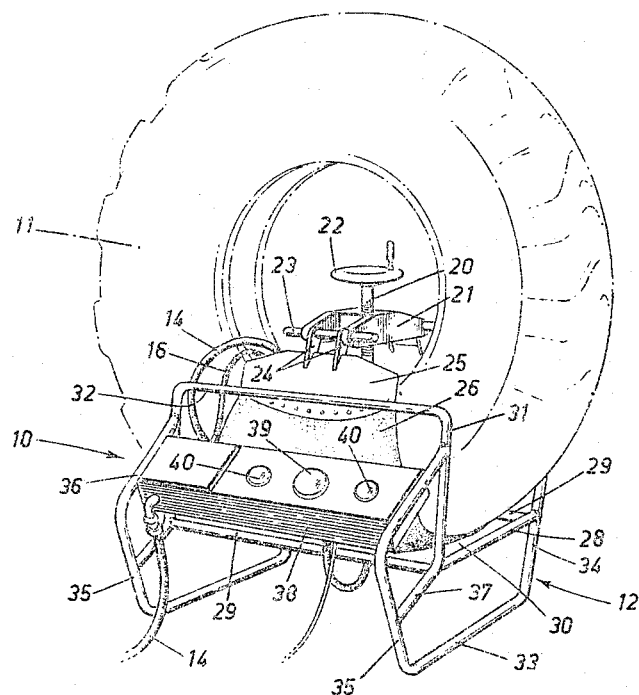
FIGURE 1 is a perspective view of one form of a vulcanizing apparatus constructed in accordance with the invention and positioned on a tire casing.

Referring now to the drawings, reference being first made to FIGURE 1 a vulcanizing apparatus, generally denoted by the numeral 10, is positioned on a tire casing 11 with both the vulcanizing apparatus 10 and the tire casing 11 being supported by a frame, generally denoted by the numeral 12.

Figure 2:
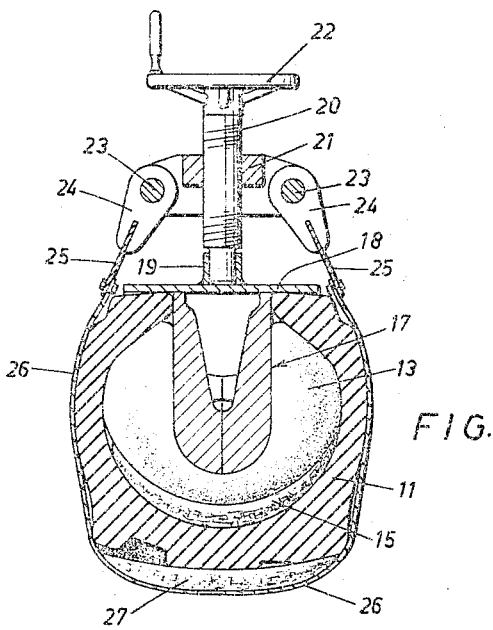
FIGURE 2 is a cross section of the vulcanizing apparatus with the supporting stand removed.
Figure 3:
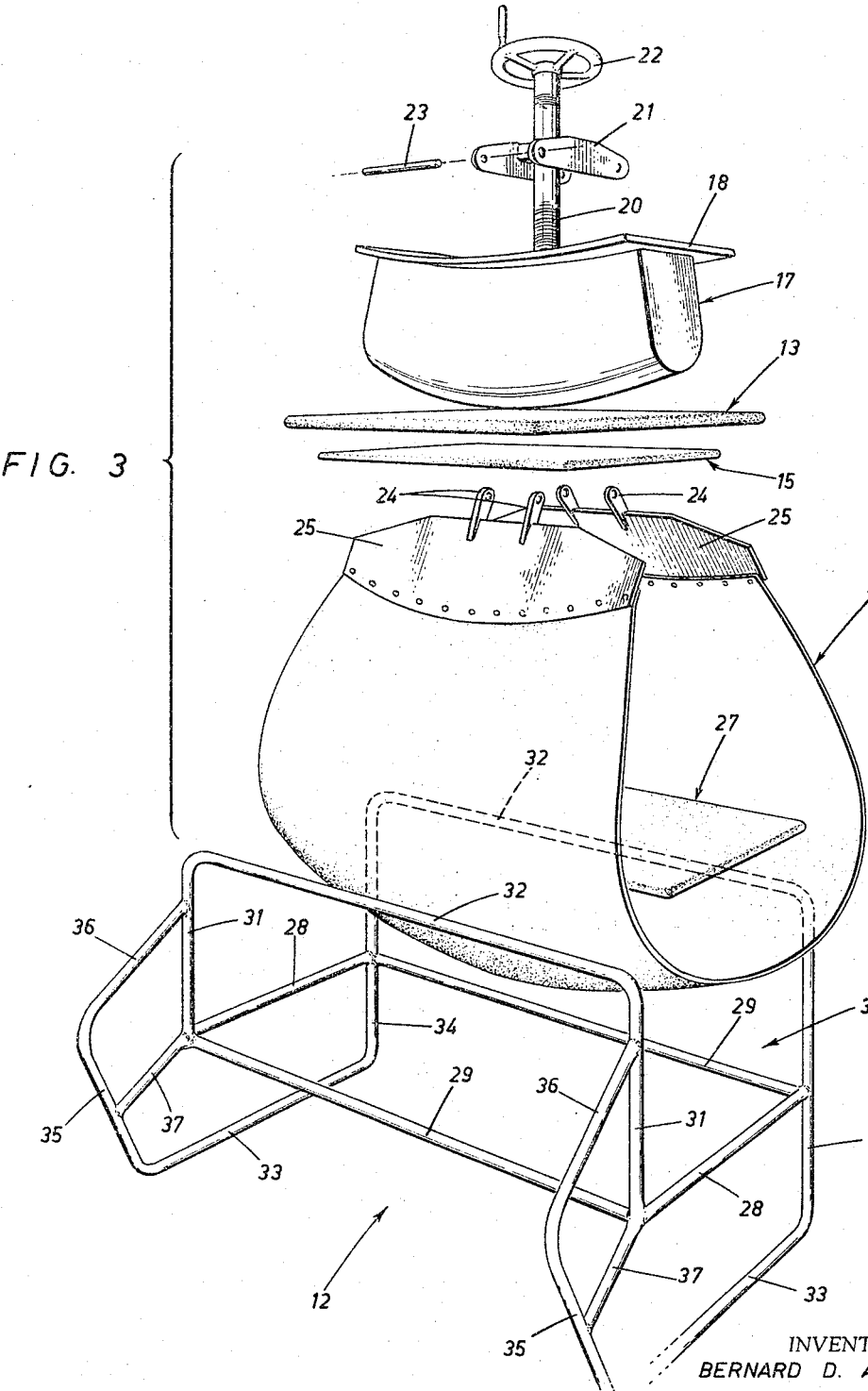
FIGURE 3 is an exploded perspective view of the vulcanizing apparatus and the supporting stand shown in FIGURE 1.

The vulcanizing apparatus 10 comprises an air bag 13 disposed within the tire casing 11, the air bag 13 being capable of sustaining great pressure and communicating with a pressure line 14. Positioned between the air bag 13 and bearing against the inner surface of the tire casing 11 is a heat pad 15 which is preferably constructed of coiled resistance wire sewn in fibre glass, the whole being molded into heat resistance butyl rubber; power is supplied to the heat pad 15 by means of a line 16 and a thermo couple, not shown, is built into the heat pad 15 to register its temperature. As shown in FIGURE 2 the air bag 13 is U-shaped to accommodate a removable core 17, preferably made of aluminum and constructed in two halves secured together by screws, which are not shown. A plate 18 is secured by suitable means to the upper end of the core 17, the plate 18 being of a width which permits it to rest on both walls of the tire casing 11 transversely thereof when the core 17 is inserted into the air bag 13 prior to inflation.

Centrally disposed on the upper surface of the plate 18 is a boss 19 which provides a seating to locate the lower end of a vertically positioned jack screw 20 which is threaded through a cross member or collar 21. The upper end of the jack screw 20 is provided with a hand wheel 22 to facilitate rotation thereof. A pin 23 traverses each end of the cross member or collar 21 and a pair of arms 24 are rotatably secured to the opposed ends of each pin 23. The lower ends of each pair of the opposed arms 24 are secured to a repective one of an opposed pair of plates 25 which, in turn, are secured at their lower ends to the ends of a flexible non-metallic envelope 26 which surrounds the tire casing 11 when the vulcanizing apparature 10 is in position. The flexible envelope 26 is preferably made of high tensile nylon to withstand the pressures which will be exerted on inflation of the air bag 13 and positioned between the nylon belt 26 and the outer surface of the tire casing 11 is a second heat pad 27 constructed similarly to the first heat pad 15.

The vulcanizing apparatus 10 is carried on a frame 12 constructed of opposed members 28, preferably of tubular steel to facilitate a light weight construction, welded at their ends to opposed members 29 to provide a cradle 30 to receive the tire casing 11 and spaced wide enough apart not to impede the movement of the flexing nonmetallic envelope 26. A vertically positioned member 31 is secured at its lower end at each junction of the members 28 and 29 and the front and rear pairs of the vertical members 31 are preferably connected at their upper ends by members 32. The vertical members 31 and the cross members 32 provide a means for preventing the tire casing 11 from toppling over when positioned in the cradle 30. The cradle 30 is supported off the ground by spaced apart base members 33 and the rear end of each is turned upward to provide members 34 secured to the end of the rear member 29; the forward end of each of the base members 33 is turned upward and outwards to form a member 35 and then inwards and upward to form a member 36 secured at its upper end to the corresponding front vertical member 31. A brace member 37 connects the forward junctions of the members 28 and 29 to the corresponding member 35. The opposed members 36 provide a means for supporting a control panel 38 carrying a gauge 39 connected to the pressure supply 14 and an ammeter 40 connected to the power line 16. A temperature indicator 41 connected to the thermo couples in the heat pads 15 and 27 is also mounted on the control panel 38 and also a timer and pilot light, not shown.

To effect a repair after a plug and/or patch is applied to the wall of a tire casing 11 the vulcanizing apparatus 10 is assembled as shown in FIGURE 1 so that the first pad 15 and the second pad 27 face each other on opposite sides of the tire casing 11. The air bag 13 is placed over the first pad 15 and the core 17 is placed in position in the air bag 13, with the plate 18 bearing against the beads of the tire casing 11. The opposed arms 24 of the flexible envelope 26 are then secured to the pins 23, the air bag 13 is then inflated and the jack screw 20 is turned by means of the hand wheel 22 to bring the envelope 26 into a tight relation with the tire casing 11 thus preventing distortion. The use of the opposed heat pads 15 and 27 ensures effective curing of the repair material positioned between them in the tire casing 11.

Figure 4:
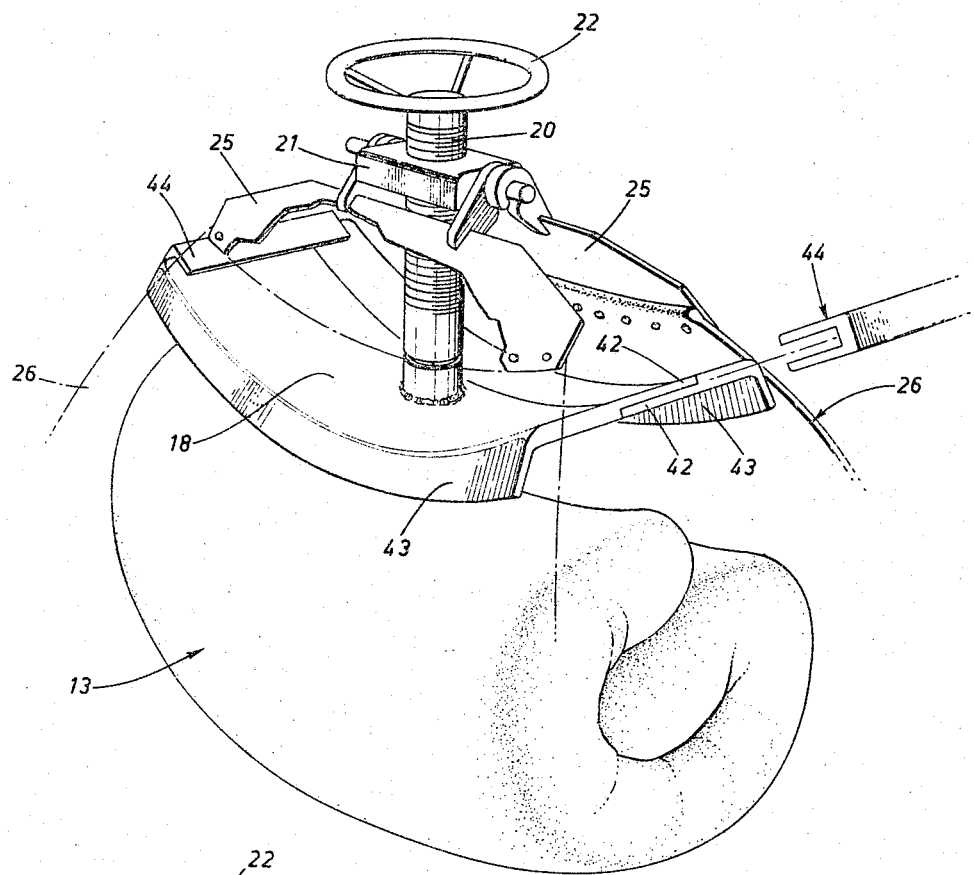
FIGURE 4 is a perspective view of an alternative embodiment of the invention.
Figure 5:
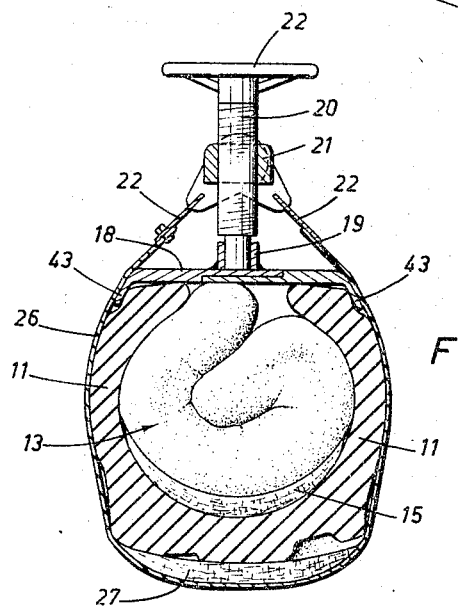
FIGURE 5 is a cross sectional view of the alternative embodiment of the invention as shown in FIGURE 4 when assembled and with the supporting stand removed.

In an alternative embodiment shown in FIGURE 4 the air bag 13 folded on itself occupies the entire space in the tire casing 11 above the heat pad 15, the core 17 being eliminated. The plate 18 is made in two parts with overlapping portions 42; both parts of the plate 18 are curved as shown to conform with the contour of the tire casing 11 and each part of the plate 18 is provided with a flange 43 which engages the rim of the tire casing 11 thus preventing sideways distortion. When pressure is applied to the plate 18 on its overlapping portions 42, by means of the jack screw 20, tilting of the parts of the plate 18 is prevented by U-shaped members 44 slidably engageable with the plate 18 over the overlapping portions 42. Through use of a split plate 18 a wide range of tire sizes can be accommodated thus eliminating the need for carrying different sizes of the core 17.

While I have shown my invention in but one form, it will be obvious to those skilled in the art that it is not so limited but is susceptible of various changes and modifications without departing from the spirit thereof, and I desire, therefore, that only such limitations shall be placed thereupon as are imposed by the prior art or as are specifically set forth in the appended claims.

I claim:

1. Portable apparatus for vulcanizing repairs to an area of a tire casing having a pair of peripheral beads, said apparatus comprising an inflatable member shaped and formed to the interior of said tire casing, a core receivable in said inflatable member, a flexible belt surrounding said tire casing, adjustable maintaining means bearing onto said core and engageable with said beads to secure them in a substantially fixed attitude one relative to the other, said belt being secured to said maintaining means, a first heat pad interposed between the interior of said casing at said area and said inflatable member, a second heat pad bearing against the outer surface of said tire casing opposed to said first heat pad and supported by said maintaining means, said adjustable means comprising a plate in contact with said beads and said core, a jack screw co-operating with a collar, one end of said jack screw bearing against said plate, pivotable arms on said collar with said flexible belt being secured to said pivotable arms.

2. Portable apparatus for repairing a tire casing having beads comprising in combination, an open frame adapted to engage and support said casing at least at two spaced apart points whereby a portion of said tire casing is freely accessible, a flexible belt having a first end and a second end adapted to surround an area of said casing to be repaired which area extends through said frame, fastening means on each end of said belt and means for holding a casing under repair in pressureable engagement with said belt, said means comprising an inflatable member of a predetermined shape insertable within said casing, a core member formed to limit the movement of said inflatable member, pressure means engageable with said casing beads to hold said beads in a fixed relationship, means for securing said belt to said pressure means comprising a pair of link members extending laterally to engage said fastening means of said belt, and activating means for raising and lowering said pressure means relative to said link means.

References Cited

UNITED STATES PATENTS

| 2,340,692 | 2/1944 | Ridd | 18—18 |
| 2,406,498 | 8/1946 | James | 18—18 |
| 2,421,100 | 5/1947 | Lakso | 18—18 |
| 3,031,719 | 5/1962 | Alm | 18—18 |
| 3,052,921 | 9/1962 | Robinson | 18—18 |

J. SPENCER OVERHOLSER, *Primary Examiner.*

E. MAR, *Assistant Examiner.*